US010343630B2

(12) United States Patent
He et al.

(10) Patent No.: US 10,343,630 B2
(45) Date of Patent: Jul. 9, 2019

(54) MONITORING METHOD AND APPARATUS

(71) Applicant: BEIJING BAIDU NETCOM SCIENCE AND TECHNOLOGY CO., LTD., Haidian District, Beijing (CN)

(72) Inventors: Wei He, Beijing (CN); Haifeng Wang, Beijing (CN); Yu Ma, Beijing (CN); Chengliang Deng, Beijing (CN); Weide Zhang, Beijing (CN); Zhuo Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 226 days.

(21) Appl. No.: 15/410,451

(22) Filed: Jan. 19, 2017

(65) Prior Publication Data
US 2018/0065575 A1 Mar. 8, 2018

(30) Foreign Application Priority Data

Sep. 6, 2016 (CN) .......................... 2016 1 0804075

(51) Int. Cl.
*G06F 11/30* (2006.01)
*B60R 16/023* (2006.01)
(Continued)

(52) U.S. Cl.
CPC ....... *B60R 16/0232* (2013.01); *G05D 1/0088* (2013.01); *G07C 5/008* (2013.01); *G07C 5/0841* (2013.01); *G08B 29/12* (2013.01)

(58) Field of Classification Search
CPC .............................................. B60R 16/0232
See application file for complete search history.

(56) References Cited

U.S. PATENT DOCUMENTS

2015/0057821 A1* 2/2015 Nasle .................... G06Q 10/04
                                                             700/291
2018/0283913 A1* 10/2018 Chen ..................... G01D 18/00

FOREIGN PATENT DOCUMENTS

CN         102761454 A        10/2012
CN         103684851 A         3/2014

* cited by examiner

*Primary Examiner* — Phuong Huynh
(74) *Attorney, Agent, or Firm* — Seed IP Law Group LLP

(57) ABSTRACT

The present application discloses a monitoring method and apparatus. A specific implementation of the method comprises: reading information about monitoring data acquisition methods of monitored objects, the monitoring data acquisition method comprising an active acquisition method and a passive acquisition method; executing following steps for each of the monitored objects having the active acquisition method as the monitoring data acquisition method: generating a monitoring data acquisition task of the monitored object; determining a monitoring data acquisition frequency of the monitored object; and adding the monitoring data acquisition task to to-be-executed monitoring data acquisition task sets in a defined period corresponding to the monitoring data acquisition frequency; executing, in successive defined periods, monitoring data acquisition tasks in the corresponding to-be-executed monitoring data acquisition task sets; and parsing acquired monitoring data of the monitored objects to generate a monitoring result. The implementation solves the problem of high system resource occupation and waste of system resources during the monitoring process.

11 Claims, 6 Drawing Sheets

(51) Int. Cl.
*G05D 1/00* (2006.01)
*G07C 5/00* (2006.01)
*G07C 5/08* (2006.01)
*G08B 29/12* (2006.01)

MONITORING METHOD AND APPARATUS

CROSS REFERENCE TO RELATED APPLICATION

This application claims the priority of Chinese Patent Application No. 201610804075.4, entitled "Monitoring Method and Apparatus," filed on Sep. 6, 2016, the content of which is incorporated herein by reference in its entirety.

TECHNICAL FIELD

The present application relates to the field of computer technology, in particular, to the field of data monitoring technology, and more particularly, to a monitoring method and apparatus.

BACKGROUND

As monitoring technologies develop rapidly and become more popular, monitoring on various types of systems has become a common system security inspection measure. In a system consisting of multiple modules, to guarantee safe and stable operation of the system, multiple objects in the system need to be monitored, such that an operator finds promptly abnormality in the system.

Existing monitoring approaches generally acquire monitoring data of the monitored objects according to a fixed frequency or acquiring monitoring data by using multiple timers according to monitoring data acquisition frequencies of the monitored objects, thereby generating a monitoring result. However, in a monitoring situation, such as an autopilot or a driverless situation, where a data link consists of multiple complex modules, there are a large number of monitored objects of complex types. Therefore, the existing monitoring technology has problems of high system resource occupation and waste of system resources during the monitoring process.

SUMMARY

An objective of the present application is to provide an improved monitoring method and apparatus, to solve the technical problem mentioned in the foregoing Background section.

In a first aspect, the present application provides a monitoring method, the method comprising: reading information about monitoring data acquisition methods of monitored objects, the monitoring data acquisition method comprising an active acquisition method and a passive acquisition method; executing following steps for each of the monitored objects is having the active acquisition method as the monitoring data acquisition method: generating a monitoring data acquisition task of the monitored object; determining a monitoring data acquisition frequency of the monitored object; and adding the monitoring data acquisition task to to-be-executed monitoring data acquisition task sets in a defined period corresponding to the monitoring data acquisition frequency; executing, in successive defined periods, monitoring data acquisition tasks in the corresponding to-be-executed monitoring data acquisition task sets; and parsing acquired monitoring data of the monitored objects to generate a monitoring result.

In some embodiments, the method further comprises: for each of the monitored objects having the passive acquisition method as the monitoring data acquisition method, detecting a monitoring data transmission request of the monitored object; and acquiring monitoring data of the monitored object in response to positively detecting the monitoring data transmission request of the monitored object.

In some embodiments, the parsing acquired monitoring data of the monitored objects to generate a monitoring result comprises: parsing acquired monitoring data of each of the monitored objects, to generate a monitoring sub-result of the monitored object; grouping the monitored objects according to a preset grouping method; analyzing monitoring sub-results of each group of monitored objects, to generate a group monitoring result of the group; and analyzing group monitoring results to generate the monitoring result.

In some embodiments, the parsing acquired monitoring data of the monitored objects to generate a monitoring result further comprises: for a preset monitored object in the monitored objects, in response to a monitoring sub-result of the preset monitored object indicating that monitoring data of the preset monitored object is abnormal, storing the abnormal monitoring data into a log file of the preset monitored object.

In some embodiments, the method further comprises: outputting the monitoring result at a preset output time interval.

In a second aspect, the present application provides a monitoring apparatus, the apparatus comprising: a reading unit, configured to read information about monitoring data acquisition methods of monitored objects, the monitoring data acquisition method comprising an active acquisition method and a passive acquisition method; a task processing unit, configured to execute following steps for each of the monitored objects having the active acquisition method as the monitoring data acquisition method: generating a monitoring data acquisition task of the monitored object; determining a monitoring data acquisition frequency of the monitored object; and adding the monitoring data acquisition task to to-be-monitored monitoring data acquisition task sets in a defined period corresponding to the monitoring data acquisition frequency; an execution unit, configured to execute, in successive defined periods, monitoring data acquisition tasks in the corresponding to-be-executed monitoring data acquisition task sets; and a parsing unit, configured to parse acquired monitoring data of the monitored objects to generate a monitoring result.

In some embodiments, the apparatus further comprises: a detecting unit, configured to: for each of the monitored objects having the passive acquisition method as the monitoring data acquisition method, detect a monitoring data transmission request of the monitored object; and acquire monitoring data of the monitored object in response to positively detecting the monitoring data transmission request of the monitored object.

In some embodiments, the parsing unit comprises: a parsing module, configured to parse acquired monitoring data of each of the monitored objects, to generate a monitoring sub-result; a first analyzing module, configured to group the monitored objects according to a preset grouping method, and analyze monitoring sub-results of each group of monitored objects, to generate a group monitoring result of the group; and a second analyzing module, configured to analyze group monitoring results to generate the monitoring result.

In some embodiments, the parsing module is further configured to: for a preset monitored object in the monitored objects, in response to a monitoring sub-result of the preset monitored object indicating that monitoring data of the preset monitored object is abnormal, store the abnormal monitoring data into a log file of the preset monitored object.

In some embodiments, the apparatus further comprises: an outputting unit, configured to output the monitoring result at a preset output time interval.

In the monitoring method and apparatus provided by the present application, for each of the monitored objects having the active acquisition method as the monitoring data acquisition method, a monitoring data acquisition task of the monitored object is generated and a monitoring data acquisition frequency of the monitored object is determined, such that the monitoring data acquisition task is added to to-be-executed monitoring data acquisition task sets in a defined period corresponding to the monitoring data acquisition frequency; then, monitoring data acquisition tasks in the corresponding to-be-executed monitoring data acquisition task sets are executed in successive defined periods; and acquired monitoring data of the monitored objects is parsed to generate a monitoring result, thereby implementing acquisition of different monitoring data based on different monitoring data acquisition frequencies without causing any additional load, and solving the problem of high system resource occupation and waste of system resources during the monitoring process.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
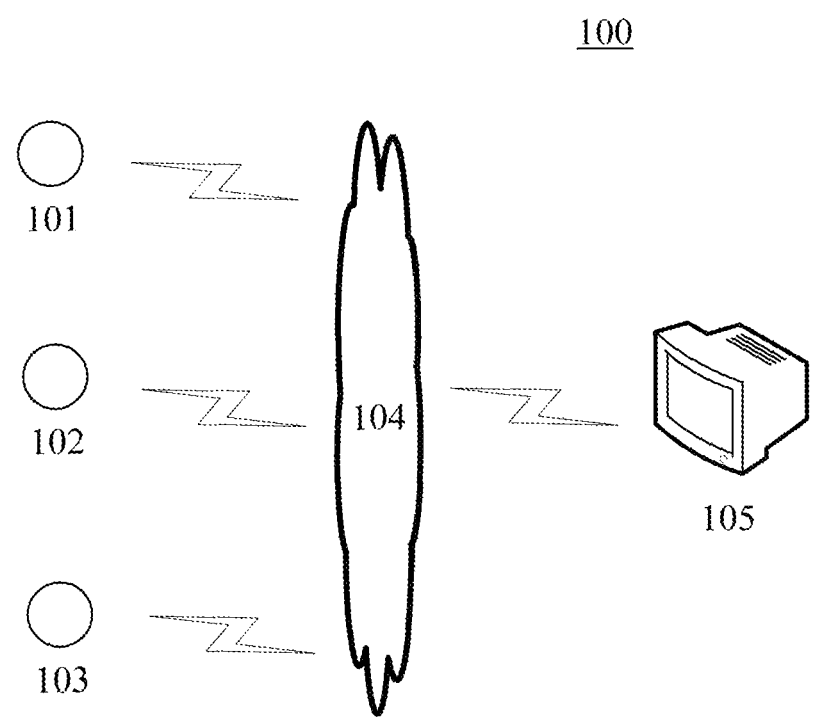
FIG. 1 is an architectural diagram of an exemplary system in which the present application may be implemented.

FIG. 1 shows an exemplary system architecture 100 in which a monitoring method or a monitoring apparatus of the present application may be implemented.

As shown in FIG. 1, the system architecture 100 may comprise monitored objects 101, 102 and 103, a network 104, and a monitoring terminal 105. The network 104 servers as a medium providing a communication link between the monitored objects 101, 102 and 103 and the monitoring terminal 105. The network 104 may comprise various types of connections, such as wired and wireless transmission links, or optical fibers.

The monitored objects 101, 102 and 103 may be various electronic devices. As an example, in an unmanned vehicle architecture or a self-driving vehicle architecture, the monitored objects 101, 102 and 103 may be sensors for different purposes, such as a sensor for a brake system, a sensor for a power system, a sensor for a starting system, a sensor for a lane departure detection system, a sensor for an adaptive cruise control system, a sensor for an automatic parking system, and a sensor for a satellite navigation system. Moreover, the monitored objects 101, 102 and 103 may be various program nodes. As an example, the above-mentioned program nodes may be various modules in an unmanned vehicle control system, such as a sensor control module, a sensing module, a positioning module, an obstacle detection module, and a decision control module. The above-mentioned program nodes may also be sub-modules in the modules, such as a temperature sensor control sub-module and a pressure sensor control sub-module in the sensor control module.

To-be-monitored data of the monitored objects 101, 102 and 103 may comprise one or more items. As an example, in the unmanned vehicle architecture or self-driving vehicle architecture, the to-be-monitored data of a monitored object LIDAR may be data collected by the LIDAR, a data scanning frequency of the LIDAR, and the like. The monitored objects 101, 102 and 103 may interact with the monitoring terminal 105 via the network 104, to receive or send messages, transmit monitoring data of each monitored object, and the like.

The monitoring terminal 105 may be various electronic devices provided with a data processing function, for example, a monitoring server that supports monitoring data sent by the monitored objects 101, 102 and 103. In the unmanned vehicle or self-driving vehicle architecture, the monitoring terminal 105 may also be a vehicle-mounted terminal device. The vehicle-mounted terminal device may parse acquired monitoring data of monitored objects in a sensor or program node, to generate a monitoring result.

It should be noted that, the monitoring method provided by the embodiments of the present application is generally executed by the monitoring terminal 105, and accordingly, the monitoring apparatus is generally installed in the monitoring terminal 105.

It should be understood that the numbers of the terminal devices, the networks and the servers in FIG. 1 are merely illustrative. Any number of monitored objects, networks and monitoring terminals may be provided based on the actual requirements.

Figures 2, 3:
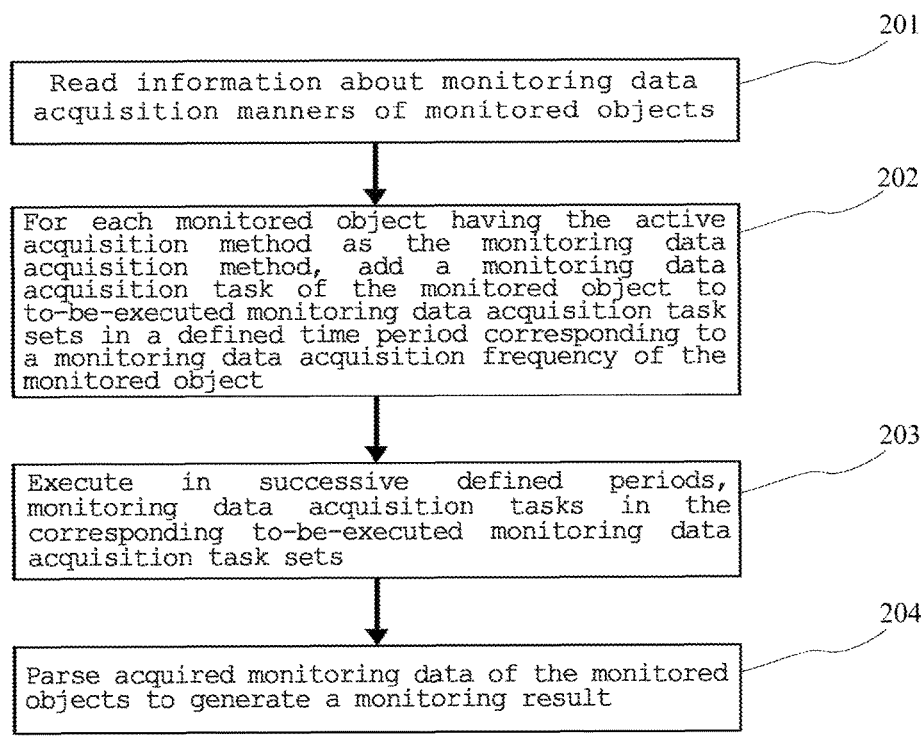
FIG. 2 is a flow chart of a monitoring method according to an embodiment of the present application.
FIG. 3 is an exploded flow chart of task processing steps in the flow chart of FIG. 2.

Further referring to FIG. 2, a flow 200 of a monitoring method according to an embodiment of the present application is shown. The monitoring method comprises the following steps:

Step 201, read information about monitoring data acquisition methods of monitored objects.

In this embodiment, an electronic device (for example, the monitoring terminal 105 shown in FIG. 1) on which the monitoring method runs may read information about monitoring data acquisition methods of various monitored objects (for example, the monitored objects 101, 102 and 103) from a configuration file pre-configured in the electronic device, wherein the monitoring data acquisition method may be an active acquisition method or a passive acquisition method. Moreover, the electronic device may acquire, through a wired or wireless communication link or a fiber-optic cable, the information about the monitoring data acquisition methods of the monitored objects from a server connected to the electronic device. It should be noted that, the active acquisition method may be a method of pooling the monitored objects to acquire monitoring data, and the passive acquisition method may be a method of acquiring monitoring data based on an event detecting mechanism, a heartbeat mechanism, and the like.

It should be noted that, the electronic device may read the information about the monitoring data acquisition method of each monitored object in any condition. For example, the electronic device may read the information about the monitoring data acquisition method of each monitored object upon starting, receiving a particular signal, or detecting a particular environment condition.

By using a self-driving vehicle architecture as an example, generally, a user starts the vehicle, and then a vehicle-mounted terminal device, upon receiving a vehicle start signal, first loads a pre-configured configuration file, and then reads the information about monitoring data acquisition methods of the monitored objects in the configuration file. In this embodiment, the configuration file may be in various formats, for example, ini format, dat format, xml format, and yaml format. In addition, when it is detected that the unmanned vehicle is in a severe environment such as in the rain or haze, the electronic device may further read, from another pre-configured file, information about a monitoring data acquisition method of an additional monitored object in the file.

Step 202, for each monitored object having the active acquisition method as the monitoring data acquisition method, execute the following steps: generating a monitoring data acquisition task of the monitored object; determining a monitoring data acquisition frequency of the monitored object; and adding the monitoring data acquisition task to to-be-executed monitoring data acquisition task sets in a defined period corresponding to the monitoring data acquisition frequency.

In this embodiment, further referring to FIG. 3, FIG. 3 is an exploded flow chart of step 202. In FIG. 3, for each monitored object having the active acquisition method as the monitoring data acquisition, step 202 is split into the following three sub-steps, that is, step 2021, step 2022 and step 2023.

Step 2021, generate a monitoring data acquisition task of the monitored object.

In this embodiment, for each monitored object having the active acquisition method as the monitoring data acquisition method, the electronic device may generate the monitoring data acquisition task of the monitored object. It should be noted that, the monitoring data of the monitored object may comprise one or more items. Therefore, the monitoring data acquisition task of the monitored object may be one or more tasks corresponding to the one or more items of monitoring data.

Step 2022, determine a monitoring data acquisition frequency of the monitored object.

In this embodiment, for each monitored object having the active acquisition method as the monitoring data acquisition method, the above-mentioned electronic device may read preset information about a monitoring data acquisition frequency of the monitored object, thereby determining the monitoring data acquisition frequency of the monitored object, wherein the monitoring data acquisition frequency is the number of times the corresponding monitoring data is acquired periodically within any period, for example, one acquisition per 200 ms, one acquisition per 500 ms, and one acquisition per 6 seconds. It should be pointed out that, the monitoring data of the monitored object may comprise one or more items, and therefore, the monitoring data acquisition frequency of the monitored object may be one or more frequencies corresponding to the one or more items of the monitoring data.

In some optional implementations of this embodiment, the information about the monitoring data acquisition frequency of each monitored object having the active acquisition method as the monitoring data acquisition method may be pre-stored in the configuration file of the above-mentioned electronic device. The above-mentioned electronic device may determine the monitoring data acquisition frequency of the monitored object by loading the configuration file. It should be noted that, the configuration file may be the configuration file storing the information about the monitoring data acquisition methods of the monitored objects in step 201, and may also be another configuration file.

In some optional implementations of this embodiment, the information about the monitoring data acquisition frequency of each monitored object having the active acquisition method as the monitoring data acquisition method may be pre-stored in a server connected to the above-mentioned electronic device. The above-mentioned electronic device may acquire the information about the monitoring data acquisition frequency from the server through a wired or wireless communication link or a fiber-optic cable, and determine the monitoring data acquisition frequency of the monitored object.

Step 2023, add the monitoring data acquisition task to to-be-executed monitoring data acquisition task sets in a defined period corresponding to the monitoring data acquisition frequency.

In this embodiment, the defined period may be any pre-configured fixed duration that is not longer than the minimum acquisition period in acquisition periods indicated by the monitoring data acquisition frequencies determined in step 2022. For example, if the monitoring data acquisition frequencies are one acquisition per 200 ms, one acquisition per 500 ms, and one acquisition per is respectively, i.e., the acquisition periods are 200 ms, 500 ms, and is respectively, the duration of each defined period may be any fixed duration that is not longer than the minimum acquisition period 200 ms, for example, 100 ms or 200 ms. Moreover, for each defined period of the preset multiple defined periods, to-be-executed monitoring data acquisition task sets in the defined period may be preset, and the monitoring data acquisition task sets may be used for storing monitoring data acquisition tasks to be executed in the defined period.

In some optional implementations of this embodiment, M defined periods may be preset, wherein M is a natural number greater than 0. For each monitored object having the active acquisition method as the monitoring data acquisition method, a time wheel comprising the above-mentioned M defined periods may be set by using a time wheel timer algorithm, such that the above-mentioned electronic device cyclically executes monitoring data acquisition tasks in the to-be-executed monitoring data acquisition task sets in the individual defined periods. According to a ratio N of the acquisition period to the defined period that is indicated by the monitoring data acquisition frequency of the monitored object determined in step 2022, the above-mentioned electronic device may add the monitoring data acquisition task of the monitored object to to-be-executed monitoring data acquisition task sets in the $(1+n\times N)^{th}$ defined period, wherein n is a natural number, and $1+n\times N\leq M$.

Figure 4:
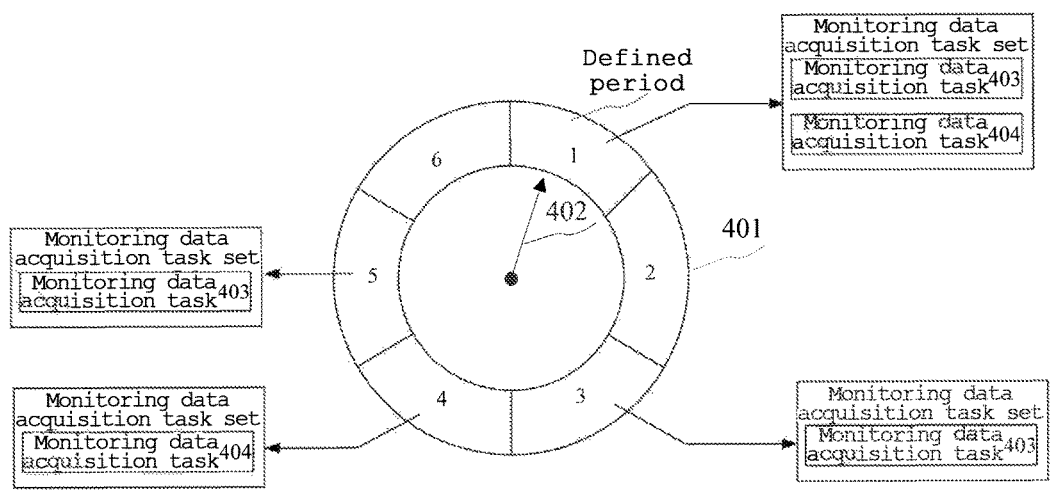
FIG. 4 is a schematic structural diagram of a time wheel involved in the present application.

As an example, a time wheel 401 shown in FIG. 4 has six defined periods in total and a pointer 402, and each defined period is 100 ms. If the monitoring data acquisition frequency indicates that corresponding monitoring data is acquired once every 200 ms, that is, the acquisition period is 200 ms, it is determined that a ratio of the acquisition period to the defined period is 2. The above-mentioned electronic device adds a monitoring data acquisition task 403 corresponding to the monitoring data acquisition frequency to the to-be-executed monitoring data acquisition task sets in the $1^{st}$ period, the $3^{rd}$ period, and the $5^{th}$ period. If another monitoring data acquisition frequency indicates that corresponding monitoring data is acquired once every 300 ms, that is, the acquisition period is 300 ms, the above-mentioned electronic device may add a monitoring data acquisition task 404 of the above-mentioned another monitored object to the to-be-executed monitoring data acquisition task sets in the $1^{st}$ period and the $4^{th}$ period.

It should be pointed out that, the time wheel may be a multi-level time wheel, which will not be described in detail herein.

In some optional implementations of this embodiment, an unlimited number of defined periods may be preset. For each monitored object having the active acquisition method as the monitoring data acquisition method, according to a ratio N of the acquisition period to the defined period that is indicated by the monitoring data acquisition frequency of the monitored object determined in step 2022, the above-mentioned electronic device may add the monitoring data acquisition task of the monitored object to the to-be-executed monitoring data acquisition task sets in the $(1+n\times N)^{th}$ defined period, wherein n is a natural number.

As an example, each defined period is 100 ms, and if the monitoring data acquisition frequency indicates that corresponding monitoring data is acquired once every 500 ms, that is, the acquisition period is 500 ms, the above-mentioned electronic device may add a monitoring data acquisition task corresponding to the monitoring data acquisition frequency to the to-be-executed monitoring data acquisition task sets in the $1^{st}$ period, the $6^{th}$ period, and the $11^{th}$ period, and the rest may be done in the same way. If another monitoring data acquisition frequency indicates that corresponding monitoring data is acquired once every 200 ms, that is, the acquisition period is 200 ms, the above-mentioned electronic device may add a monitoring data acquisition task of the above-mentioned another monitored object to the to-be-executed monitoring data acquisition task sets in the $1^{st}$ period, the $3^{rd}$ period, and the $5^{th}$ period, and the rest may be done in the same way.

Step 203, execute, in successive defined periods, monitoring data acquisition tasks in the corresponding to-be-executed monitoring data acquisition task sets.

In this embodiment, the above-mentioned electronic device first may search for monitoring data acquisition tasks in the corresponding to-be-executed monitoring data acquisition task sets in successive defined periods in various ways; and then, execute the found monitoring data acquisition tasks, that is, acquire monitoring data of monitored objects corresponding to the found monitoring data acquisition tasks.

In some optional implementations of this embodiment, if the preset defined periods are a fixed number of defined periods, the electronic device may search for monitoring data acquisition tasks by using the time wheel timer algorithm. Specifically, the pointer of the time wheel points to a defined period at a defined time interval, and sequentially points to the defined periods in the time wheel in a chronological order. Each time the pointer of the time wheel points to a defined period, the above-mentioned electronic device searches for monitoring data acquisition tasks from to-be-executed monitoring data acquisition task sets in the defined period to which the above-mentioned pointer points.

In some optional implementations of this embodiment, if the preset defined periods are an unlimited number of defined periods, the above-mentioned electronic device may search for monitoring data acquisition tasks in the corresponding to-be-executed monitoring data acquisition task sets in successive defined periods in a chronological order.

In this embodiment, the electronic device may transmit the found monitoring data acquisition tasks to a pre-created monitoring data acquisition task queue; extract monitoring data acquisition tasks from the monitoring data acquisition task queue in parallel by using multiple threads, and execute the extracted monitoring data acquisition tasks. Specifically, the electronic device may acquire the monitoring data in various data transmission ways, such as parallel transmission, serial transmission, synchronous transmission, asynchronous transmission, simplex transmission, half-duplex transmission, and full-duplex transmission. By using a self-driving vehicle architecture as an example, after finding monitoring data acquisition tasks, a vehicle-mounted terminal device first sends data read instructions to various sensors connected to the vehicle-mounted terminal device or various program nodes in the self-driving vehicle, and acquires monitoring data of the sensors or program nodes in a parallel transmission way, in response to that the sensors or program nodes receive the instructions.

Step 204, parse acquired monitoring data of the monitored objects to generate a monitoring result.

In this embodiment, the above-mentioned electronic device may first parse the acquired monitoring data of the monitored objects, check the monitoring data by using pre-configured checking information to generate monitoring sub-results of the monitored objects, and then, generate the monitoring result according to different preset rules.

In some optional implementations of this embodiment, the above-mentioned electronic device may first parse the acquired monitoring data of the monitored objects to generate monitoring sub-results of the monitored objects; and in response to any one of the monitoring sub-results indicating that the monitoring data is abnormal, generate a monitoring result about the abnormal monitoring data. For example, after acquiring a current signal that is sent by a fuel level sensor and used for indicating a fuel amount, the vehicle-mounted terminal device generates fuel amount information according to a current magnitude indicated by the current signal; then compares the fuel amount information with a preset fuel amount threshold in the vehicle-mounted terminal device; and determines that the fuel amount of the self-driving vehicle is insufficient if the fuel amount information is below the preset fuel amount threshold, and sends alarm information about the insufficient fuel amount.

In some optional implementations of this embodiment, the above-mentioned electronic device may first parse the acquired monitoring data of the monitored objects to generate monitoring sub-results of the monitored objects; and then analyze the monitoring sub-results to generate the monitoring result. As an example, when monitored objects of the self-driving vehicle are multiple LIDARs, after acquiring monitoring data that indicates the working frequencies of the LIDARs, the vehicle-mounted terminal device compares the working frequency of a corresponding LIDAR indicated by each piece of monitoring data with a working frequency threshold of the LIDAR, and generates a monitoring sub-result indicating that the LIDAR is abnormal if the working frequency of the LIDAR is below the above-mentioned working frequency threshold. Then, the above-mentioned vehicle-mounted terminal device determines the number of LIDARs that are abnormal; determines, in response to that the above-mentioned number is above a preset threshold of the number of abnormal LIDARs, that the LIDARs of the self-driving vehicle work abnormally; generates a monitoring result indicating that the self-driving vehicle works abnormally; and sends alarm information about an abnormal self-driving mode or sends a parking instruction to a control system.

Figure 5:
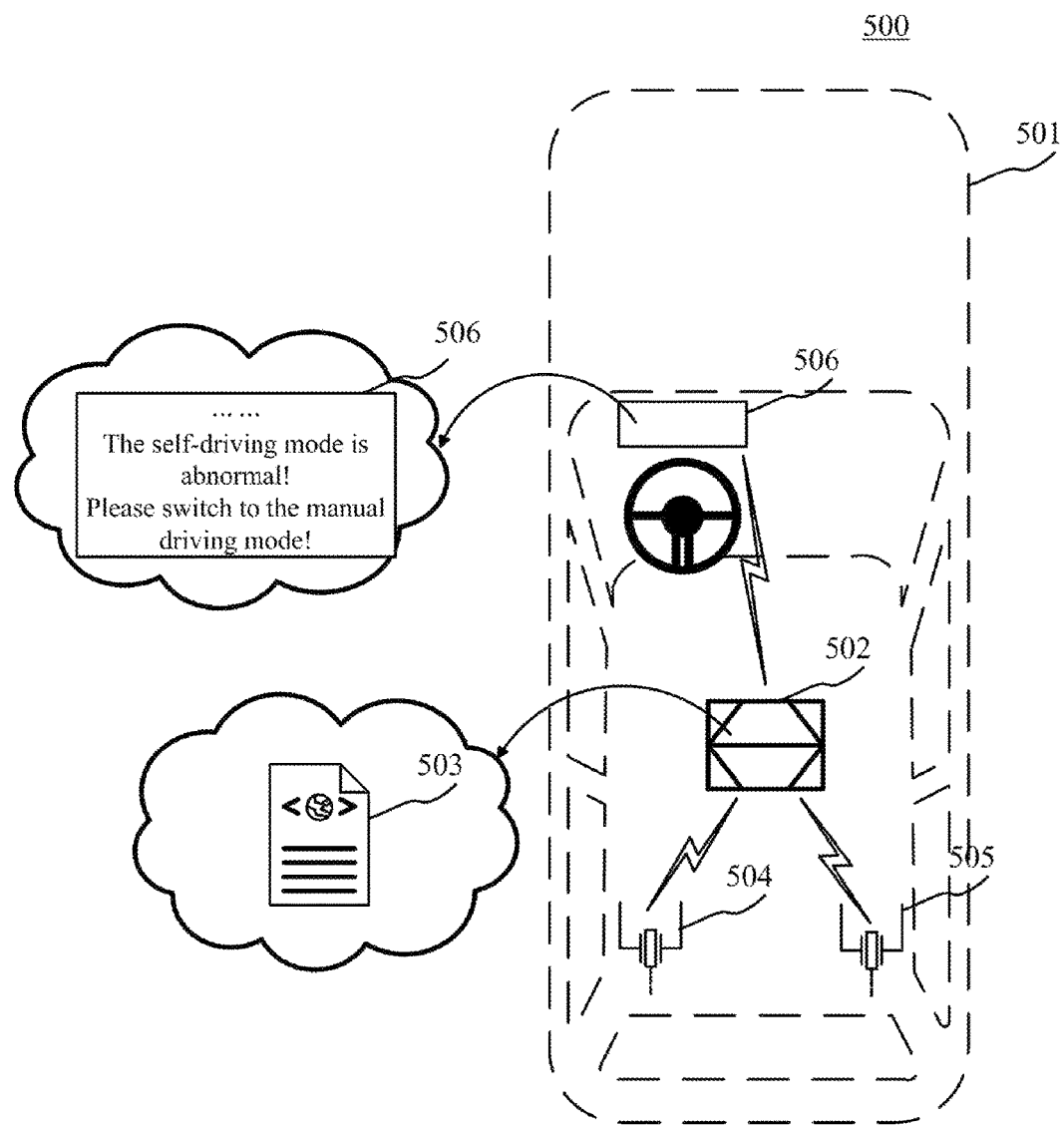
FIG. 5 is a schematic diagram of an application scenario of a monitoring method according to the present application.

Continue to refer to FIG. 5. FIG. 5 is a schematic diagram 500 of an application scenario of a monitoring method according to this embodiment. In the application scenario of FIG. 5, when a self-driving vehicle 501 is started, a vehicle-mounted terminal device 502 first loads a pre-configured configuration file 503, and reads from the configuration file 503 information about monitoring data acquisition methods of monitored objects. Then, for LIDARs 504 and 505 having an active acquisition method as the monitoring data acquisition method, the vehicle-mounted terminal device 502 generates monitoring data acquisition tasks of the LIDARs 504 and 505 respectively, reads monitoring data acquisition frequencies of the LIDARs 504 and 505 from the configuration file 503, and adds the above-mentioned monitoring data acquisition tasks to to-be-executed monitoring data acquisition task sets in defined periods corresponding to the above-mentioned monitoring data acquisition frequencies. Then, the vehicle-mounted terminal device 502 executes the monitoring data acquisition tasks in the corresponding to-be-executed monitoring data acquisition task sets in successive defined periods, to obtain working frequency data of the LIDARs 504 and 505. Finally, the acquired working frequency data of the LIDARs 504 and 505 is parsed, and in response to that the working frequency data of the LIDAR 504 and the working frequency data of the LIDAR 505 are both below a working frequency threshold, alarm information indicating that a self-driving mode is abnormal is displayed on an instrument board 506.

The method provided in the embodiments of the present application monitors different monitored objects based on different monitoring frequencies, thereby solving the problem of high system resource occupation and waste of system resources during the monitoring process.

Figure 6:
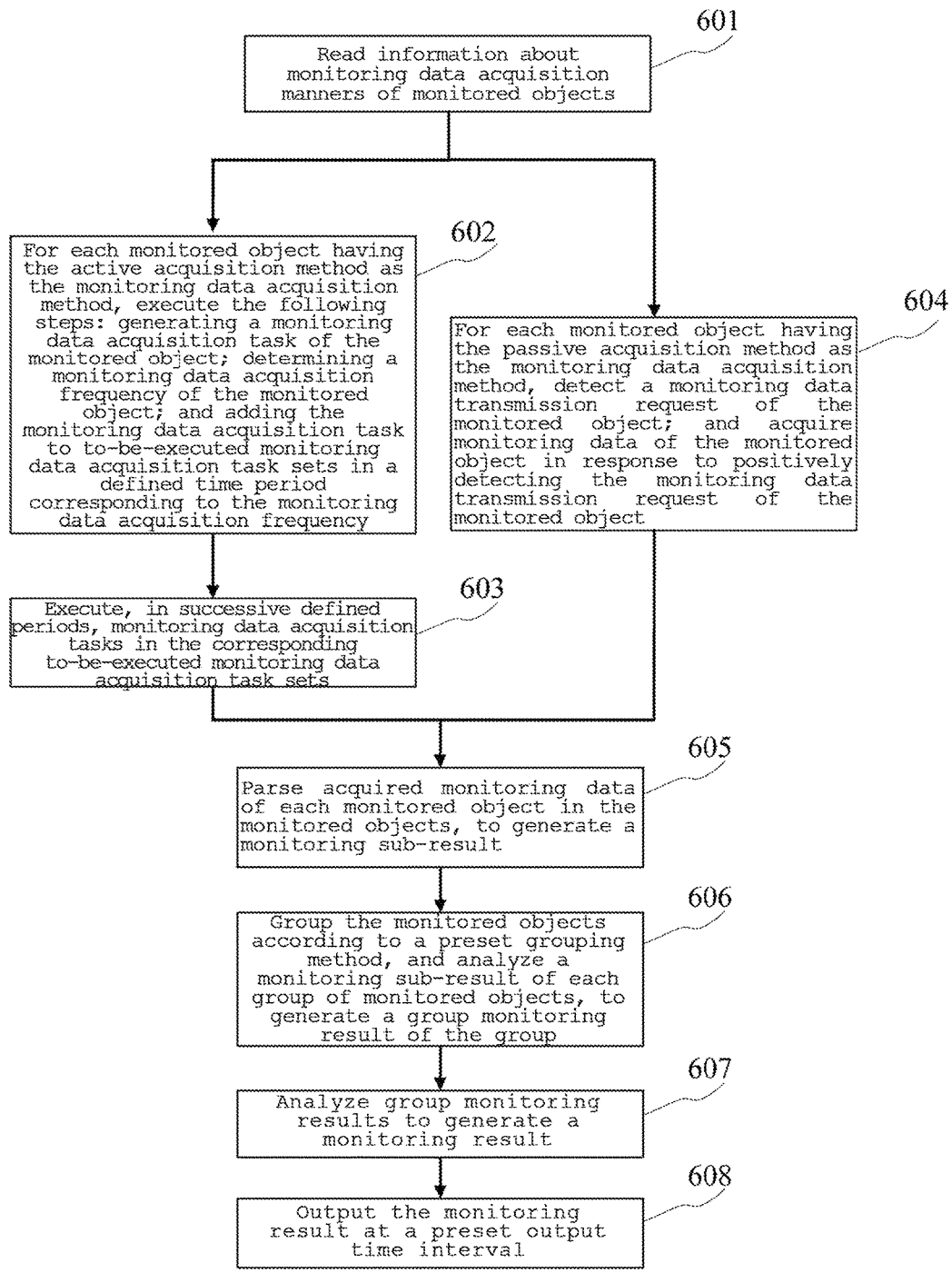
FIG. 6 is a flow chart of a monitoring method according to another embodiment of the present application.

Further refer to FIG. 6, which shows a flow 600 of another embodiment of a monitoring method. The flow 600 of the monitoring method comprises the following steps:

Step 601, read information about monitoring data acquisition methods of monitored objects.

In this embodiment, an electronic device (for example, the monitoring terminal 105 shown in FIG. 1) on which the monitoring method runs may read information about monitoring data acquisition methods of various monitored objects (for example, the monitored objects 101, 102 and 103) from a configuration file pre-configured in the above-mentioned electronic device, wherein the monitoring data acquisition method may be an active acquisition method or a passive acquisition method.

In this embodiment, for each monitored object having the active acquisition method as the monitoring data acquisition method, the above-mentioned electronic device may execute steps 602 and 603; and for each monitored object having the passive acquisition method as the monitoring data acquisition method, the electronic device may execute step 604.

Step 602, for each monitored object having the active acquisition method as the monitoring data acquisition method, the following steps are executed: generating a monitoring data acquisition task of the monitored object; determining a monitoring data acquisition frequency of the monitored object; and adding the monitoring data acquisition task to to-be-executed monitoring data acquisition task sets in a defined period corresponding to the monitoring data acquisition frequency.

In this embodiment, for each monitored object having the active acquisition method as the monitoring data acquisition method, the above-mentioned electronic device may generate a monitoring data acquisition task of the monitored object. It should be noted that, the monitoring data of the monitored object may comprise one or more items, and therefore, the monitoring data acquisition task of the monitored object may be one or more tasks corresponding to the one or more items of the monitoring data.

In this embodiment, for each monitored object having the active acquisition method as the monitoring data acquisition method, the above-mentioned electronic device may read preset information about a monitoring data acquisition frequency of the monitored object, thereby determining the monitoring data acquisition frequency of the monitored object. It should be pointed out that, the monitoring data of the monitored object may comprise one or more items, and therefore, the monitoring data acquisition frequency of the monitored object may be one or more frequencies corresponding to the above-mentioned one or more items of the monitoring data.

In this embodiment, M defined periods may be preset, wherein M is a natural number greater than 0. The defined period may be any pre-configured fixed duration that is not longer than the minimum acquisition period in acquisition periods indicated by the monitoring data acquisition frequencies. Moreover, for each defined period of the above-mentioned preset multiple defined periods, to-be-executed monitoring data acquisition task sets in the defined period may be preset, and the monitoring data acquisition task sets may be used for storing at least one monitoring data acquisition task to be executed in the defined period. For each monitored object having the active acquisition method as the monitoring data acquisition method, the electronic device may set, by using a time wheel timer algorithm, a time wheel comprising the M defined periods, such that the electronic device circularly executes monitoring data acquisition tasks in the to-be-executed monitoring data acquisition task sets in the defined periods. According to a ratio N of the acquisition period to the defined period that is indicated by the monitoring data acquisition frequency of the monitored object, the above-mentioned electronic device may add the monitoring data acquisition task of the monitored object to to-be-executed monitoring data acquisition task sets in the $(1+n \times N)^{th}$ defined period, wherein n is a natural number, and $1+n \times N \leq M$.

Step 603, execute, in successive defined periods, monitoring data acquisition tasks in the corresponding to-be-executed monitoring data acquisition task sets.

In this embodiment, the electronic device first may search for monitoring data acquisition tasks in the corresponding to-be-executed monitoring data acquisition task sets in successive defined periods in various methods; and then, execute the found monitoring data acquisition tasks, that is, acquire monitoring data of monitored objects corresponding to the found monitoring data acquisition tasks.

Concrete operations of step 601 to step 603 are substantially the same as the specific operations of step 201 to step 203, and will not be repeated herein.

In this embodiment, after reading the information about the monitoring data acquisition methods of the monitored objects, the electronic device may further execute step 604:

Step 604: for each monitored object having the passive acquisition method as the monitoring data acquisition method, detect a monitoring data transmission request of the monitored object; and acquire monitoring data of the monitored object in response to positively detecting the monitoring data transmission request of the monitored object.

In this embodiment, for each monitored object having the passive acquisition method as the monitoring data acquisition method, the above-mentioned electronic device may detect, via its own socket, the data transmission request sent by the socket of the monitored object, wherein the data transmission request comprises to-be-transmitted monitoring data; in response to positively detecting the data transmission request sent by the socket of the to-be-monitored object, the above-mentioned electronic device first establishes, via its own socket, a connection to the socket of the monitored object, and then acquires the to-be-transmitted monitoring data.

It should be noted that, the detecting method is a well-known technology widely researched and applied at present, and will not be described in detail herein.

Step 605, parse acquired monitoring data of each monitored object in the monitored objects, to generate a monitoring sub-result.

In this embodiment, the above-mentioned electronic device may parse, by using various parsing measures, monitoring data of each monitored object acquired in step 603 and/or step 604, to generate a monitoring sub-result of the monitored object. The parsing method may be conducting a numerical check on the monitoring data of the monitored object, and the monitoring sub-result of the monitored object is generated by checking whether a numerical value of the monitoring data is in a preset threshold range or determining whether a numerical value of the monitoring data is a preset numerical value. In addition, when the monitored object is a sensor, the electronic device may also first conduct a data conversion on the acquired monitoring data of the sensor, and then conduct numerical analysis on the converted data to generate a monitoring sub-result of the sensor. As an example, a vehicle water temperature sensor is a semiconductor thermistor, which has a greater resistance at a lower water temperature. The vehicle-mounted terminal device may first convert resistance value data sent by the vehicle water temperature sensor into water temperature data, and then conduct a numerical check on the water temperature data, thereby determining whether the water temperature is abnormal.

In some optional implementations of this embodiment, for a preset monitored object in the monitored objects, in response to a monitoring sub-result of the preset monitored object indicating that the monitoring data of the preset monitored object is abnormal, the above-mentioned electronic device may further store the abnormal monitoring data into a log file of the preset monitored object, such that the electronic device conducts a failure detection on abnormal data in the log file or an operator conducts a failure analysis. The above-mentioned preset monitored object may be at least one monitored object in the monitored objects.

In some optional implementations of this embodiment, the above-mentioned electronic device may further pre-store multiple independent data processing code blocks and data processing code block call information of the monitored objects, wherein the data processing code block call information of each monitored object is used for indicating data processing code blocks that need to be called when processing the monitoring data of the monitored object, and a calling sequence. The above-mentioned multiple data processing code blocks may comprise, but not limited to, at least one of the following: a frequency detection code block, a temperature detection code block, a pressure detection code block, a log file analysis code block, and a data storage code block. For each monitored object, the above-mentioned electronic device may call, based on the preset data processing code block call information corresponding to the monitored object, the data processing code blocks corresponding to the monitored object sequentially in the calling sequence indicated by the data processing code block call information, to process the monitoring data of the monitored object, thereby generating the monitoring data processing result of the monitored object.

Step 606, group the monitored objects according to a preset grouping method, and analyze monitoring sub-results of each group of monitored objects, to generate a group monitoring result of the group.

In this embodiment, the electronic device may group the monitored objects according to various preset grouping methods, conduct analyses such as statistics and numerical comparison on monitoring sub-results of each group of monitored objects, to generate the group monitoring result of the group.

In some optional implementations of this embodiment, the above-mentioned grouping method may be grouping based on functions of the monitored objects. As an example, the monitored objects of the self-driving vehicle are multiple LIDARs and multiple temperature sensors, and in this case, the monitored objects of the self-driving vehicle may be grouped into a LIDAR group and a temperature sensor group based on functions of the monitored objects. After monitoring sub-results of the LIDARs and the temperature sensors are generated, the vehicle-mounted terminal device determines the number of abnormal LIDARs and the number of abnormal temperature sensors; in response to that the number of abnormal LIDARs is above a preset threshold of the number of abnormal LIDARs and that the number of abnormal temperature sensors is below a preset threshold of the number of abnormal temperature sensors, it is determined that the LIDAR group of the self-driving vehicle works abnormally and the temperature sensor group of the self-driving vehicle works normally.

In some optional implementations of this embodiment, the above-mentioned grouping method may be grouping based on modules to which the monitored objects belong. As an example, the monitored objects of the self-driving vehicle are program nodes. Then, the monitored objects may be grouped into a sensor control group, a sensing group, a positioning group, an obstacle detection group, a decision control group and the like based on modules to which the program nodes belong. The vehicle-mounted terminal device analyzes monitoring data of the program nodes of each group, to generate group monitoring results of the groups.

Step 607, analyze group monitoring results to generate a monitoring result.

In this embodiment, the above-mentioned electronic device may analyze group monitoring results generated in step 606, to generate the monitoring result. For example, in response to that the LIDAR group of the self-driving vehicle works abnormally and the temperature sensor group of the self-driving vehicle works normally, the electronic vehicle may determine that the self-driving vehicle does not have a traveling ability in a self-driving mode; and in response to that the LIDAR group and the temperature sensor group of the self-driving vehicle both work abnormally, the electronic vehicle may determine that the self-driving vehicle does not have a traveling ability.

Step 608, output the monitoring result at a preset output time interval.

In this embodiment, the above-mentioned electronic device may output the monitoring result at the preset output time interval, wherein the time interval may be any duration. Specifically, the above-mentioned electronic device may output the monitoring result regularly by using an installed timer. The above-mentioned monitoring result may be prompt information describing whether a system works normally. When the monitoring result indicates that the system is abnormal, the above-mentioned monitoring result may further be alarm information, an operating instruction or the like. For example, when it is determined that the self-driving vehicle does not have the traveling ability in the self-driving mode, the above-mentioned electronic device sends an alarm or directly sends a parking instruction.

It can be seen from FIG. 6 that, compared with the embodiment corresponding to FIG. 2, the flow 600 of the monitoring method in this embodiment emphasizes the step of acquiring monitoring data for each monitored object having the passive acquisition method as the monitoring data acquisition method and the step of generating the monitoring result based on levels. Therefore, the solution described in this embodiment may acquire more monitoring data and further refine the process of generating the monitoring result, thereby implementing more comprehensive monitoring and generating of a more effective monitoring result.

Figure 7:
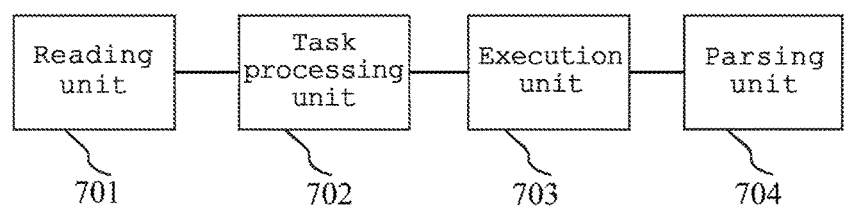
FIG. 7 is a schematic structural diagram of a monitoring apparatus according to an embodiment of the present application.

Further referring to FIG. 7, as an implementation of the methods shown in the above drawings, the present application provides an embodiment for a monitoring apparatus. The apparatus embodiment corresponds to the method embodiment shown in FIG. 2. The apparatus may be specifically applied to various electronic devices.

As shown in FIG. 7, the monitoring apparatus 700 described in this embodiment comprises: a reading unit 701, a task processing unit 702, an execution unit 703, and a parsing unit 704. The reading unit 701 is configured to read information about monitoring data acquisition methods of monitored objects, wherein the monitoring data acquisition method is an active acquisition method or a passive acquisition method. The task processing unit 702 is configured to: execute the following steps for each monitored object having the active acquisition method as the monitoring data acquisition method: generating a monitoring data acquisition task of the monitored object; determining a monitoring data acquisition frequency of the monitored object; and adding the monitoring data acquisition task to to-be-executed monitoring data acquisition task sets in a defined period corresponding to the monitoring data acquisition frequency. The execution unit 703 is configured to execute monitoring data acquisition tasks in the corresponding to-be-executed monitoring data acquisition task sets in successive defined periods. The parsing unit 704 is configured to parse acquired monitoring data of the monitored objects to generate a monitoring result.

In this embodiment, the reading unit 701 of the monitoring apparatus 700 may read the information about the monitoring data acquisition methods of the monitored objects from a pre-configured configuration file, wherein the monitoring data acquisition method may be an active acquisition method or a passive acquisition method. Moreover, the electronic device may acquire, through a wired or wireless communication link or a fiber-optic cable, the information about the monitoring data acquisition methods of the monitored objects from a server connected to the electronic device.

In this embodiment, for each monitored object having the active acquisition method as the monitoring data acquisition method, the task processing unit 702 may generate a monitoring data acquisition task of the monitored object. It should be noted that, the monitoring data of the monitored object may comprise one or more items, and therefore, the monitoring data acquisition task of the monitored object may be one or more tasks corresponding to the above-mentioned one or more items of the monitoring data.

In this embodiment, for each monitored object having the active acquisition method as the monitoring data acquisition method, the above-mentioned task processing unit 702 may read preset information about a monitoring data acquisition frequency of the monitored object, thereby determining the monitoring data acquisition frequency of the monitored data, wherein the monitoring data acquisition frequency is the number of times the corresponding monitoring data is acquired periodically in any period. It should be pointed out that, the monitoring data of the monitored object may comprise one or more items, and therefore, the monitoring data acquisition frequency of the monitored object may be one or more frequencies corresponding to the above-mentioned one or more items of the monitoring data.

In this embodiment, the task processing unit 702 may preset multiple defined periods, wherein the above-mentioned defined periods may be any pre-configured fixed duration that is not longer than the minimum acquisition period in acquisition periods indicated by the monitoring data acquisition frequencies. Moreover, for each defined period of the above-mentioned preset multiple defined periods, monitoring data acquisition task sets to be executed in the defined period may be preset, and the monitoring data acquisition task sets may be used for storing at least one monitoring data acquisition task to be executed in the defined period. The above-mentioned task processing unit 702 may add, by using a time wheel timer algorithm, the above-mentioned monitoring data acquisition task to to-be-executed monitoring data acquisition task sets in a defined period corresponding to the above-mentioned monitoring data acquisition frequency.

In this embodiment, the above-mentioned execution unit 703 may search for monitoring data acquisition tasks in the corresponding to-be-executed monitoring data acquisition task sets in successive defined periods by using various algorithms such as the time wheel timer algorithm; transmit the found monitoring data acquisition tasks to a pre-created monitoring data acquisition task queue; and finally extract monitoring data acquisition tasks from the above-mentioned monitoring data acquisition task queue in parallel by using multiple threads, and execute the extracted monitoring data acquisition tasks.

In some optional implementations of this embodiment, the above-mentioned monitoring apparatus 700 may further comprise a detecting unit, configured to: for each monitored object having the passive acquisition method as the monitoring data acquisition method, detect a monitoring data transmission request of the monitored object; and acquire monitoring data of the monitored object in response to positively detecting the monitoring data transmission request of the monitored object.

In this embodiment, the above-mentioned parsing unit 704 may first parse the acquired monitoring data of the monitored objects, check the monitoring data by using pre-configured checking information to generate monitoring sub-results of the monitored objects, and then, generate the monitoring result according to different preset rules.

In some optional implementations of this embodiment, the above-mentioned parsing unit 704 may comprise: a parsing module, configured to parse acquired monitoring data of each monitored object in the monitored objects, to generate a monitoring sub-result; a first analyzing module, configured to group the monitored objects according to a preset grouping method, and analyze monitoring sub-results of each group of monitored objects, to generate a group monitoring result of the group; and a second analyzing module, configured to analyze group monitoring results to generate the monitoring result.

In some optional implementations of this embodiment, the above-mentioned parsing module is further configured to: for a preset monitored object in the monitored objects, in response to a monitoring sub-result of the preset monitored object indicating that monitoring data of the preset monitored object is abnormal, store the abnormal monitoring data into a log file of the preset monitored object.

In some optional implementations of this embodiment, the above-mentioned monitoring apparatus 700 further comprises: an outputting unit, configured to output the monitoring result at a preset output time interval.

In the monitoring apparatus provided by the foregoing embodiment of the present application, first, the reading unit 701 reads information about monitoring data acquisition methods of monitored objects; then, for each monitored object having an active acquisition method as the monitoring data acquisition method, the task processing unit 702 adds, by generating a monitoring data acquisition task of the monitored object and determining a monitoring data acquisition frequency of the monitored object, the monitoring data acquisition task to to-be-executed monitoring data acquisition task sets in a defined period corresponding to the monitoring data acquisition frequency; then, the execution unit 703 executes monitoring data acquisition tasks in the corresponding to-be-executed monitoring data acquisition task sets in successive defined periods; and finally, the parsing unit 704 parses acquired monitoring data of the monitored objects to generate a monitoring result, thereby implementing acquisition of different monitoring data according to different monitoring data acquisition frequencies, and solving the problems of high system resource occupation and waste of system resources in the monitoring process.

Figure 8:
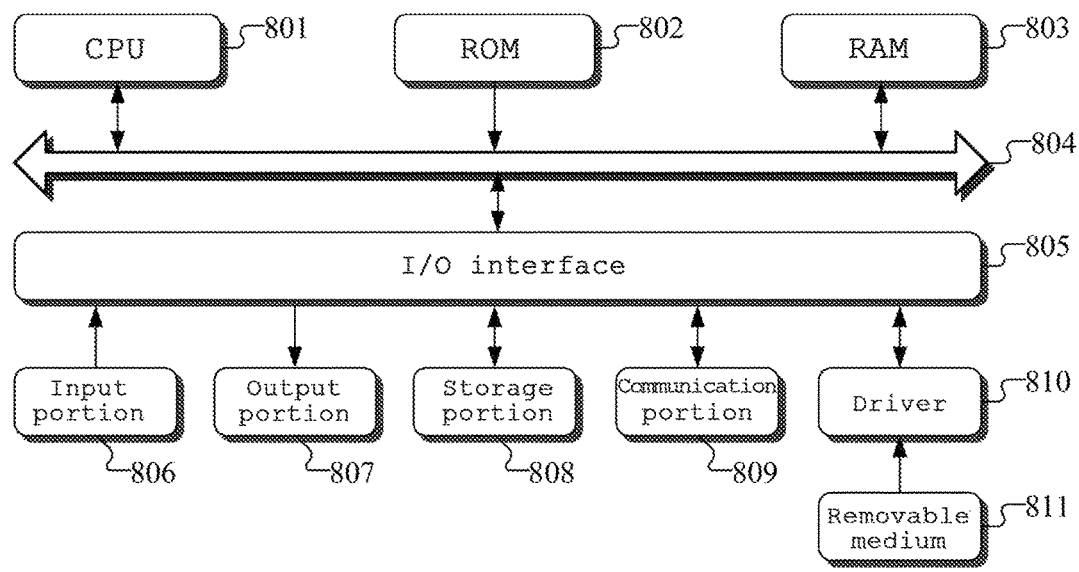
FIG. 8 is a schematic structural diagram of a computer system adapted to implement a monitoring terminal of the embodiment of the present application.

Referring to FIG. 8, a schematic structural diagram of a computer system 800 adapted to implement a monitoring appratus of the embodiments of the present application is shown.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse etc.; an output portion 807 comprising a cathode ray tube (CRT), a liquid crystal display device (LCD), a speaker etc.; a storage portion 808 including a hard disk and the like; and a communication portion 809 comprising a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810, to facilitate the retrieval of a computer program from the removable medium 811, and the installation thereof on the storage portion 808 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method of the flow charts. In such an embodiment, the computer program may be downloaded and installed from a network via the communication portion 809, and/or may be installed from the removable media 811.

The flow charts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a reading unit, a task processing unit, an executing unit and a parsing unit, where the names of these units or modules are not considered as a limitation to the units or modules. For example, the reading unit may also be described as "a unit for reading information about monitoring data acquisition methods of monitored objects".

In another aspect, the present application further provides a non-volatile computer readable storage medium. The non-volatile computer readable storage medium may be the non-volatile computer readable storage medium included in the apparatus in the above embodiments, or a stand-alone computer readable storage medium which has not been assembled into the apparatus. The non-volatile computer readable storage medium stores one or more programs. The one or more programs, when executed by a device, cause the device to: read information about monitoring data acquisition methods of monitored objects, the monitoring data acquisition method comprising an active acquisition method and a passive acquisition method;

execute following steps for each of the monitored objects having the active acquisition method as the monitoring data acquisition method: generating a monitoring data acquisition task of the monitored object; determine a monitoring data acquisition frequency of the monitored object; and add the monitoring data acquisition task to to-be-executed monitoring data acquisition task sets in a defined period corresponding to the monitoring data acquisition frequency; execute, in successive defined periods, monitoring data acquisition tasks in the corresponding to-be-executed monitoring data acquisition task sets; and parsE acquired monitoring data of the monitored objects to generate a monitoring result.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A monitoring method, comprising:
   reading information about monitoring data acquisition methods of monitored objects, the monitoring data acquisition method comprising an active acquisition method and a passive acquisition method;
   executing following steps for each of the monitored objects having the active acquisition method as the monitoring data acquisition method: generating a monitoring data acquisition task of the monitored object; determining a monitoring data acquisition frequency of the monitored object; and adding the monitoring data acquisition task to to-be-executed monitoring data acquisition task sets in a defined period corresponding to the monitoring data acquisition frequency;
   executing, in successive defined periods, monitoring data acquisition tasks in the corresponding to-be-executed monitoring data acquisition task sets; and
   parsing acquired monitoring data of the monitored objects to generate a monitoring result.

2. The monitoring method according to claim 1, further comprising:
   for each of the monitored objects having the passive acquisition method as the monitoring data acquisition method, detecting a monitoring data transmission request of the monitored object; and acquiring monitoring data of the monitored object in response to positively detecting the monitoring data transmission request of the monitored object.

3. The monitoring method according to claim 1, wherein the parsing acquired monitoring data of the monitored objects to generate a monitoring result comprises:
   parsing acquired monitoring data of each of the monitored objects, to generate a monitoring sub-result of the monitored object;
   grouping the monitored objects according to a preset grouping method;
   analyzing monitoring sub-results of each group of monitored objects, to generate a group monitoring result of the group; and
   analyzing group monitoring results to generate the monitoring result.

4. The monitoring method according to claim 3, wherein the parsing acquired monitoring data of the monitored objects to generate a monitoring result further comprises:
   for a preset monitored object in the monitored objects, in response to a monitoring sub-result of the preset monitored object indicating that monitoring data of the preset monitored object is abnormal, storing the abnormal monitoring data into a log file of the preset monitored object.

5. The monitoring method according to claim 1, further comprising:
   outputting the monitoring result at a preset output time interval.

6. A monitoring apparatus, comprising:
   a reading unit, configured to read information about monitoring data acquisition methods of monitored objects, the monitoring data acquisition method comprising an active acquisition method and a passive acquisition method;
   a task processing unit, configured to execute following steps for each of the monitored objects having the active acquisition method as the monitoring data acquisition method: generating a monitoring data acquisition task of the monitored object; determining a monitoring data acquisition frequency of the monitored object; and adding the monitoring data acquisition task to to-be-monitored monitoring data acquisition task sets in a defined period corresponding to the monitoring data acquisition frequency;
   an execution unit, configured to execute, in successive defined periods, monitoring data acquisition tasks in the corresponding to-be-executed monitoring data acquisition task sets; and
   a parsing unit, configured to parse acquired monitoring data of the monitored objects to generate a monitoring result.

7. The monitoring apparatus according to claim 6, further comprising:
   a detecting unit, configured to: for each of the monitored objects having the passive acquisition method as the monitoring data acquisition method, detect a monitoring data transmission request of the monitored object; and acquire monitoring data of the monitored object in response to positively detecting the monitoring data transmission request of the monitored object.

8. The monitoring apparatus according to claim 6, wherein the parsing unit comprises:
   a parsing module, configured to parse acquired monitoring data of each of the monitored objects, to generate a monitoring sub-result of the monitored object;
   a first analyzing module, configured to group the monitored objects according to a preset grouping method, and analyze monitoring sub-results of each group of monitored objects, to generate a group monitoring result of the group; and
   a second analyzing module, configured to analyze group monitoring results to generate the monitoring result.

9. The monitoring apparatus according to claim 8, wherein the parsing module is further configured to:
   for a preset monitored object in the monitored objects, in response to a monitoring sub-result of the preset monitored object indicating that monitoring data of the preset monitored object is abnormal, store the abnormal monitoring data into a log file of the preset monitored object.

10. The monitoring apparatus according to claim 6, further comprising:
an outputting unit, configured to output the monitoring result at a preset output time interval.

11. A non-transitory storage medium storing one or more programs, the one or more programs when executed by a device, causing the device to perform a monitoring method, the monitoring method comprising:
reading information about monitoring data acquisition methods of monitored objects, the monitoring data acquisition method comprising an active acquisition method and a passive acquisition method;
executing following steps for each of the monitored objects having the active acquisition method as the monitoring data acquisition method: generating a monitoring data acquisition task of the monitored object; determining a monitoring data acquisition frequency of the monitored object; and adding the monitoring data acquisition task to to-be-executed monitoring data acquisition task sets in a defined period corresponding to the monitoring data acquisition frequency;
executing, in successive defined periods, monitoring data acquisition tasks in the corresponding to-be-executed monitoring data acquisition task sets; and
parsing acquired monitoring data of the monitored objects to generate a monitoring result.

* * * * *